United States Patent Office 3,149,644
Patented Sept. 22, 1964

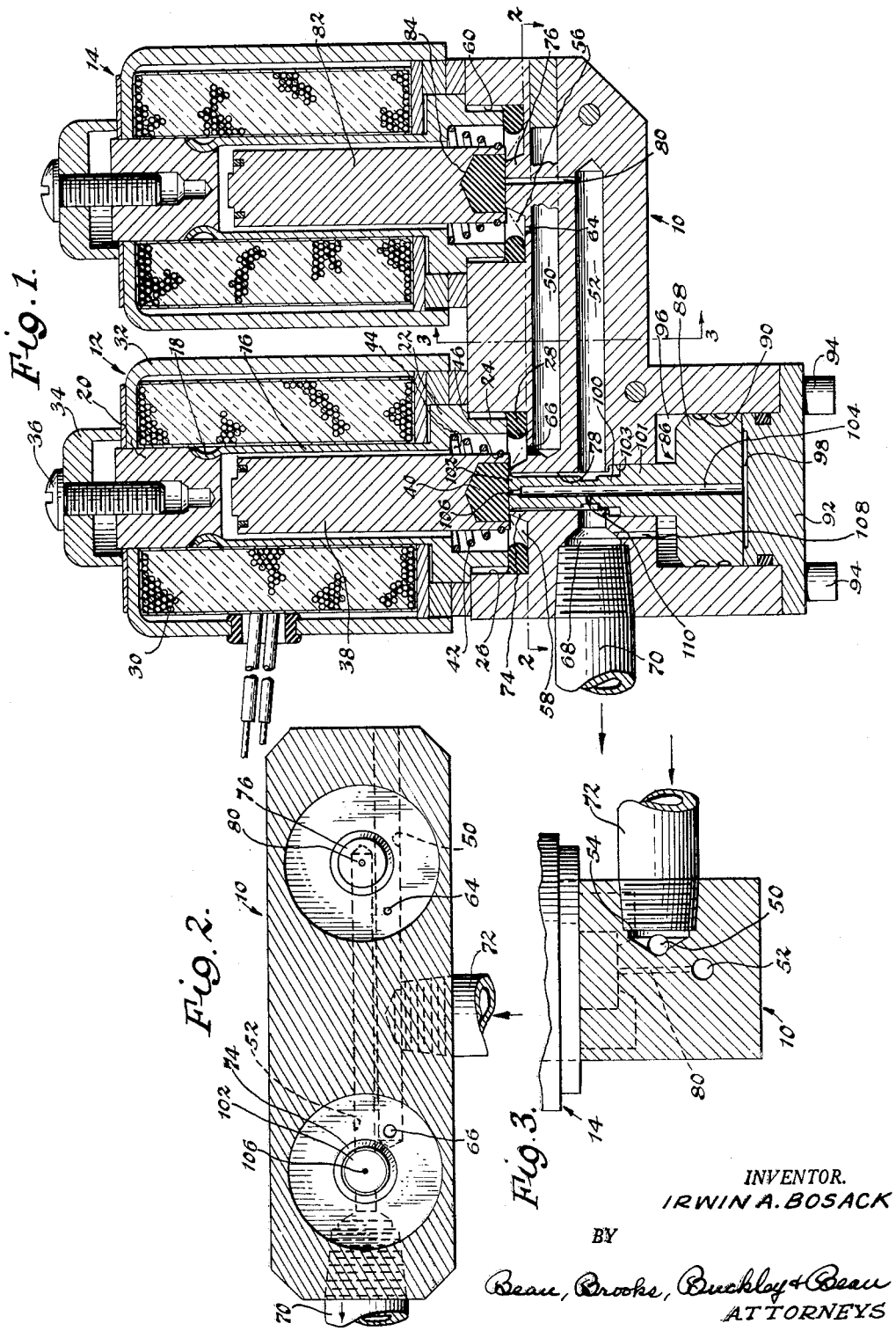

3,149,644
PRESSURE RELIEF VALVE SYSTEM
Irwin A. Bosack, Buffalo, N.Y., assignor to American
Optical Company, Southbridge, Mass.
Filed July 6, 1961, Ser. No. 122,170
3 Claims. (Cl. 137—599)

This invention relates to valve mechanisms in general and pertains more particularly to an improved valve assembly for use in conjunction with a hydraulic system and particularly for use as a relief valve therefor.

Although the present invention is usable in other and different combinations, the same is particularly adapted for use in conjunction with an ophthalmic chair. The present invention, when associated with such a mechanism, is capable of lowering the chair at various speeds which may range from very gradual speed to relatively rapid speed and with incorporation being made for preventing line shock or pressure build-ups with higher speeds utilized.

More specifically, the present invention encompasses the provision of a compound valve mechanism wherein at least two separate valves are provided in the return or relief line in the hydraulic system for an ophthalmic chair for example wherein the valve may be utilized separately or cumulatively to permit a greater or lesser flow of fluid to accomplish a correspondingly greater or lesser speed of descent of the mechanism.

Thus, the valve mechanism will be subject to a varying range of pressures and, to this end, it is of primary concern in connection with the present invention to provide an improved form of valve mechaism capable of operation over a wide range of pressures without the danger of external loss of fluid.

An object of the present invention is to provide a mechanism as aforesaid wherein a common manifold is employed directed to a plurality of valve mechanisms and wherein the connections between the manifold and the individual valve mechanisms are of varying diameter to thus control the rate of flow therethrough.

Another object of the present invention is to provide a mechanism in accordance with the preceding objects wherein provision is made for absorbing shocks in the hydraulic system when the greater flow characteristics therethrough are utilized.

Other objects and advantages of the invention will become apparent during the following discussion of one practical embodiment of the invention illustrated in the drawings, wherein:

FIG. 1 is a vertical section taken through a compound valve assemblage in accordance with the present invention and illustrating details of internal construction thereof;

FIG. 2 is a horizontal section taken substantially along the plane of section line 2—2 in FIG. 1 and showing the relationships of the various bores and passageways within the valve block; and FIG. 3 is a vertical section taken substantially along the plane of section line 3—3 in FIG. 1 illustrating the distribution of fluid within the assemblage.

Referring at this time more particularly to FIG. 1, the reference numeral 10 therein indicates in general a valve block mechanism which mounts a pair of electromagnet members indicated generally by the reference characters 12 and 14, each of which is of similar construction and is mounted in a similar fashion upon the valve block 10. For example, considering the mechanism 12, the same embodies a vertical elongate sleeve 16 which is swaged as at 18 for interconnection with a nut member or plug 20 at its upper end and which at its lower end is provided with an annular flange 22 having a projecting nose portion 24 which is externally threaded and is adapted to be received in a threaded recess 26 in the valve block 10. A suitable seal such as an O-ring 28 is interposed between the lower face of the nose or projection 24 and the bottom of the recess 26.

Surrounding the sleeve 16 is an electromagnetic coil 30 housed within a cover member 32 of generally bell shape configuration and which is held in place in covering relationship to the coil 30 by means of a suitable cap member 34 and associated screw thread fastener 36 engaged with the nut member 20. Slidably disposed within the sleeve 16 is an armature 38 which normally is spaced from the plug or nut member 20 but which is adapted, upon actuation of the coil 30, to be moved axially to engage the plug 20. The lower end of the armature 38 is provided with a plug 40 of resilient material for purposes hereinafter more fully described and in order to urge the armature 38 to the position as is shown in FIG. 1 wherein it is spaced from the plug member 20, there is provided a compression spring 42 seated against the shoulder 44 at one end thereof and having its other end engaged with the free end of the armature 38, as within a circumferentially extending groove 46 therein.

The valve block or body 10 is provided with a pair of bores or passageways 50 and 52, the former of which constitutes a common manifold member and which is intersected by an inlet bore 54, see particularly FIG. 3. This manifold 50 communicates with the two chambers 56 and 58, formed by the recesses 60 and 26 respectively, through the medium of passageways 64 and 66.

The other passageway 52 connects with an outlet bore or opening 68 to which the outlet line 70 is connected, the inlet line being indicated by reference character 72, see particularly FIGS. 2 and 3. Within the two recesses 26 and 60, are frusto-conical valve seat portions 74 and 76 respectively the former of which is provided with a somewhat enlarged bore 78 communicating with the passage 52 and the latter of which is provided with a similar bore 80 communicating also with the passage 52. Thus, both of the valve assemblages are connected to the outlet manifold 52. In the case of the valve mechanism indicated generally by the reference character 14, the armature 82 thereof is provided with a plug 84 of resilient material, similar to the previously mentioned plug 40, which is adapted to seat upon the upper end of the valve seat 76 and thus selectively block off the passageway or bore 80 from the chamber 56. Consequently, when the parts are in the position as is shown in FIG. 1, the inlet manifold 50 is out of communication with the outlet manifold 52 insofar as the valve structure 14 is concerned.

In similar fashion, the unseating of the plug 40 of armature 38 from the frusto-conical valve seat 74 achieved by energization of the coil 30 establishes connection or communication between the passage 58 and the bore 78 and deenergization of the coil will permit the spring 42 to urge the armature 38 to valve-closing position, blocking communication between the chamber 58 and the bore 78. However, means is provided for delaying the return action of the armature 38 under the action of the spring 42 when the coil 30 has been deenergized. This delaying means is in the form of the pilot valve indicated generally by the reference character 86 which includes a piston portion 88 received within a recess 90 formed in the valve block 10 and provided with a suitable sealing plate 92 secured thereto as by means of fasteners 94. Within the recess 90, the piston portion 88 defines chambers 96 and 98. The delaying means also includes a valve stem 100 rigid with the piston portion 88 and extending therefrom upwardly through the bore 78 and terminating in an enlarged head portion 102 which is adapted to seat upon the valve seat component 74 so that when the assembly 86 is in the position shown in FIG. 1, the flow of fluid through the bore 78 to the return manifold 52 is prevented. The stem 100 also has an enlarged base portion 101 received in counterbore 103, it being appreciated that the fit of the piston portion 88 within recess 90 is such as to effectively seal between chambers 96 and 98 while the fit of stem portion 101 within counterbore 103 is such as to effectively seal between chamber 96 and bore 78. No other seals are necessary since the connections of the system are entirely internal. That is, even should leakage occur, as will be most likely with high internal pressures, such would be confined internally and no loss of fluid would occur.

However, such leakage is not likely inasmuch as it will be appreciated that the pressure differentials which occur, even under high internal pressure, will be small because of the internal relationship. That is, the pressure differential between the inlet chambers 56 and 58 and the outlet 68 will be small in any case and since essentially this small differential only will appear as between chamber 96 and chamber 98 or between chamber 96 and bore 78, leakage is not apt to occur. Note that such would not be the case were chamber 96 vented to atmosphere, for example.

The valve stem 100 is provided with an axially extending bore 104 provided with a reduced diameter passage 106 at its upper end against which the plug 40 is adapted to engage to block flow normally through this passageway 104. It will be seen that the passageway or bore 104 communicates with the lower chamber 98 within the recess 90 and that the upper chamber 96 communicates by means of a passage 108 with the return line passageway 68. Thus, when the coil 30 is energized, the armature 38 immediately is retracted into engagement with the plug member 20 at the upper end of the sleeve 16, initially opening the passage 106 and permitting fluid to flow from the manifold 50 through the passage 66 into the chamber 58 and downwardly through the orifice or passage 106 and the bore 104 into the chamber 98. This action lifts the pilot valve assembly 86 up against the plug 40 of the armature 38 and consequently unseats the head portion 102 of the valve stem from the valve seat 74 and thus permits the high pressure fluid in chamber 58 to flow through bore 78 to the outlet manifold 52 and then out the return line 70. When the coil 30 is deenergized, the spring 42 will tend to force the armature 38 back to its normal position and is shown in FIG. 1 and will insure a tight seating of the plug 40 against the upper end of the valve stem 100 to thus close off the passage 106. This traps fluid in the chamber 98 so that it can flow outwardly thereof only through the restricted bleed passage 110 in the valve stem which directly communicates with the return line 70, thus delaying the closing action of the valve stem 100 as urged by the armature 38 and its associated spring 42. Thus, there is a gradual closing of the connection between the inlet manifold 50 and the return manifold 52 through the passage 66, chamber 58 and bore 78.

In the operation of the valve assembly, it is preferred that the size of the orifice 80 be such as to render the valve unit 14 the slow speed unit whereas the difference in area between passage 78 and the valve stem 100 be much greater than the area of orifice 80, so as to render valve unit 12 the high speed unit. At any rate, the size of orifice 80 is such that the bleed-off rate therethrough is not sufficient to require any shock absorbing system such as is employed in valve unit 12.

Insofar as the operation of unit 12 is concerned, it will be understood that the delay of opening thereof is dependent upon the area of orifice 106 relative to the area of the orifice 110. The larger the relative area of the orifice 106, the faster the pilot valve will follow the armature 38 and the smaller its relative area, the more opening delay will occur. In considering the delay in closing, it will be appreciated that this is dominantly affected by the area of orifice 110 and to some extent by the area of orifice 108. However, as far as orifice 108 is concerned, it is preferred that the same be sufficiently large as to avoid it being the controlling factor inasmuch as it would, under these circumstances, also affect the opening delay.

From the above, it will be readily apparent that by making the valve assembly 12 and 14 selectively operable, and by controlling the size of the orifices as aforesaid, lowering motion of the associated ophthalmic chair may be closely controlled. For example, when the valve assembly 14 only is energized, due to the size of the orifice 80, the flow of return fluid will be of rather small volume so that a very gradual lowering of the chair will result. When the valve 12 is energized only, the somewhat larger size of the area between passage 78 and valve stem 100 will permit a much greater volume of return fluid to flow through the valve assembly, thus effecting a more rapid descent of the chair structure. Because of this more rapid descent, it is not desirable to rapidly close off the valve when the coil 30 becomes deenergized and the delaying mechanism in the form of a pilot valve 86 is utilized for this purpose so as to dissipate inertia of the chair as it is lowering in a more gradual fashion than would occure were the valve to have a rapid closing action. This same shock absorbing principle is also employed when the two valves 12 and 14 are used simultaneously in which case the cumulative effect of the two orifices involved will be reflected to effect the most rapid descent of the chair. Upon simultaneous closing of both of these valve structures 12 and 14, the flow through the orifice 64 is immediately interrupted and then the flow through the orifice 66 will be delayed somewhat still under the influence of the pilot valve mechanism 86. Thus, in all instances where rapid descent is achieved, the shock absorbing mechanism is operable whereas in the case of such descent as does not require a shock absorbing action, that is when the valve 14 is operated alone, no such shock absorbing action will be achieved.

Whereas only one specific example of the invention has been described hereinabove, it will be understood that various changes may be made therein without departing from the spirit of the invention or the scope of the appended claims.

What is claimed is:

1. A pressure relief valve assembly comprising a valve block having an inlet passage and an outlet passage therein, a pair of valve devices mounted on said block and cooperating therewith to define a pair of valve chambers, said valve block having a pair of restricted orifices leading from said inlet passage respectively to said valve chambers whereby the valve chambers are in constant communication with said inlet passage, said valve block also having a pair of valve seats formed therein, one in each valve chamber, and there being a bore leading from each valve seat to said outlet passage, each valve device including an electromagnetic coil and a movable armature, one of said armatures being spring-biased to normally seat directly upon one of said valve seats to thereby normally block flow from its associated valve chamber through its associated bore to said outlet passage, a pilot valve including a stem loosely received in the other bore and having an enlarged head seated normally on the other valve seat to block flow therethrough, said valve stem having an axial bore, the armature of the other valve device being normally spring-biased to engage said pilot valve stem head to block flow through said axial bore and to seat said head upon its associated valve seat, said pilot valve also including a piston portion received in said valve block and forming piston chambers on opposite sides thereof, said axial bore communicating with that piston chamber below the piston portion while the other piston chamber is communicated directly with said outlet passage, said piston chamber below the piston portion also having a restricted bleed passage communicating directly with said outlet passage to delay opening movement and return movement of the pilot valve against the seating action of the armature associated therewith, and means for selectively actuating said valve devices singly and in combination.

2. A valve system for use in the return line of a hydraulic raising and lowering mechanism, comprising a pair of valves connected to such return line in parallel relation, said valves being selectively operable singly and in combination with one of the valves having a restricted flow orifice of one size and the other having a restricted orifice of another size to effect a wide range of flow characteristics therethrough in accord with the manner of valve actuation, and delayed-action opening and closing means associated only with that one of said valves having the larger size restricted orifice associated therewith.

3. The system according to claim 2 wherein both valves are electromagnetically operated, each including a movable armature normally spring-biased to valve closing position, said delayed action opening and closing means tending to oppose closing movement of the armature of said one valve.

References Cited in the file of this patent
UNITED STATES PATENTS

| | | |
|---|---|---|
| 1,757,059 | Rickenberg | May 6, 1930 |
| 2,296,266 | Breckenridge | Sept. 22, 1942 |
| 2,784,738 | Thurber | Mar. 12, 1957 |
| 3,011,753 | Kroffke | Dec. 5, 1961 |